(12) United States Patent
Berne

(10) Patent No.: US 11,414,013 B2
(45) Date of Patent: Aug. 16, 2022

(54) VIEWING SYSTEM FOR A VEHICLE AND VEHICLE COMPRISING SUCH VIEWING SYSTEM

(71) Applicant: Volvo Truck Corporation, Gothenburg (SE)

(72) Inventor: Nicolas Berne, Heyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/290,000

(22) PCT Filed: Nov. 7, 2018

(86) PCT No.: PCT/EP2018/080500
§ 371 (c)(1),
(2) Date: Apr. 29, 2021

(87) PCT Pub. No.: WO2020/094227
PCT Pub. Date: May 14, 2020

(65) Prior Publication Data
US 2022/0001802 A1   Jan. 6, 2022

(51) Int. Cl.
*B60R 1/00* (2022.01)
*B60R 16/02* (2006.01)
(Continued)

(52) U.S. Cl.
CPC ............ *B60R 1/00* (2013.01); *B60R 16/0207* (2013.01); *H04N 5/2253* (2013.01); *H04N 7/183* (2013.01);
(Continued)

(58) Field of Classification Search
None
See application file for complete search history.

(56) References Cited

U.S. PATENT DOCUMENTS

| 2011/0031809 A1 | 2/2011 | Yoshida et al. |
| 2012/0162420 A1* | 6/2012 | Onishi ..................... B60R 1/00 348/143 |

(Continued)

FOREIGN PATENT DOCUMENTS

| DE | 102006054120 A | 5/2008 |
| DE | 102008036460 A | 5/2009 |

(Continued)

OTHER PUBLICATIONS

International Search Report and Written Opinion for International Application No. PCT/EP2018/080500, dated Feb. 13, 2019, 14 pages.

(Continued)

*Primary Examiner* — Rebecca A Volentine
(74) *Attorney, Agent, or Firm* — Withrow & Terranova, PLLC

(57) ABSTRACT

Viewing system (20) for a vehicle, comprising: —at least one camera (25), —a monitor (26) arranged within the compartment (4), —at least one cable (30) connecting the camera (25) to the monitor (26), —at least one support (21) comprising a fixed support part (22) and a movable support part (23) rotatably mounted on the fixed support part (22), wherein the support (21) comprises at least one tensioning arrangement (35) configured to resiliently urge at least a cable portion of the cable (30) along a travel as the movable support part (23) is moved in a plurality of positions.

11 Claims, 6 Drawing Sheets

(51) Int. Cl.
    *H04N 5/225* (2006.01)
    *H04N 7/18* (2006.01)
(52) U.S. Cl.
    CPC ....... *B60R 2300/10* (2013.01); *B60R 2300/20* (2013.01)

(56) References Cited

U.S. PATENT DOCUMENTS

2014/0285666 A1* 9/2014 O'Connell ............... B60R 1/12
                                                          348/148
2018/0265015 A1* 9/2018 Rohrmüller ........... B60R 1/0617

FOREIGN PATENT DOCUMENTS

DE    102012015395 B3      11/2013
FR         2778280 A1      11/1999
FR         3013524 A1       5/2015
JP        H04201639 A       7/1992
JP        H10145659 A       5/1998
JP        2000006735 A      1/2000
WO     WO-2004110704 A1 * 12/2004  .......... B25J 19/0029

OTHER PUBLICATIONS

Examination Report for European Patent Application No. 18803897.0, dated Feb. 11, 2022, 8 pages.

* cited by examiner

VIEWING SYSTEM FOR A VEHICLE AND VEHICLE COMPRISING SUCH VIEWING SYSTEM

This application is a 35 USC 371 national phase filing of International Application No. PCT/EP2018/080500, filed Nov. 7, 2018, the disclosure of which is incorporated herein by reference in its entirety.

FIELD OF THE DISCLOSURE

The invention relates to a viewing system for a vehicle and to a vehicle comprising such viewing system.

BACKGROUND OF THE DISCLOSURE

A viewing system is used in a vehicle to provide a driver installed at a driving place of a compartment of the vehicle with one or several views of surroundings of the vehicle. The views comprise at least one or several lateral views of the surroundings arranged rearward and at a side of the driving place. The views may also comprise a rear view of the surroundings arranged rearward behind the driving place.

Viewing systems have long implemented mirrors to provide the views. Especially, viewing systems have implemented one or several side mirrors, each mounted outward the compartment on a side of a frame of the vehicle. Possibly, viewing systems implement a front mirror mounted in the compartment on an upward, laterally offset location of the windshield in front of the driver place.

Mirrors in viewing systems are progressively replaced by cameras connected to a monitor so that the same views can be provided in a more accurate manner and with a better modularity thanks to the ability of processing images of the views upon acquisition by the cameras and/or display by the monitor.

Each camera is connected to the monitor through a cable. The cable, configured to transfer high resolution and high speed data, is generally a coax cable which, although bendable, presents certain rigidity and comprises connectors to be connected to corresponding connectors of the camera and the monitor.

To protect the camera against deterioration or to enhance modularity of the viewing system with specific constructive arrangements, the camera is mounted on a movable support part of a support, which movable support part is rotatable with respect to the frame of the vehicle to present a plurality of positions. For side supports receiving a camera for acquiring lateral views, the plurality of positions includes for example a driving position in which the movable support part extends away from the compartment of the vehicle and a folded position in which the movable support part is brought close to the compartment of the vehicle.

In an alternative or complementary manner, for visibility considerations, in particular with respect to a specific position of the driver and/or lightening conditions, the monitor may also be mounted on a movable support part of a support, which movable support part is rotatable with respect to the frame of the vehicle to present a plurality of positions.

However, as the movable support part is moved, the cable is bent resulting in a risk of deterioration of the cable as well as of its connectors or that of the camera and the monitor.

SUMMARY OF THE DISCLOSURE

The invention aims to solve the above mentioned problems.

To this end, according to a first aspect, the invention proposes a vehicle comprising:
a frame extending along a longitudinal direction and defining a compartment with a driving place, and
a viewing system configured to provide a driver installed at the driving place with at least one view of surroundings of the vehicle,
wherein the viewing system comprises:
at least one camera configured to acquire the view of the surroundings,
a monitor arranged within the compartment and configured to display the view of the surroundings,
at least one cable connecting the camera to the monitor,
at least one support comprising a fixed support part secured to the frame and a movable support part rotatably mounted on the fixed support part to present a plurality of positions with respect to the fixed support part, the movable support part supporting one device chosen among the camera and the monitor,
wherein the support comprises at least one tensioning arrangement configured to resiliently urge at least a cable portion of the cable along a travel as the movable support part is moved in the plurality of positions.

The tensioning arrangement imparts a progressive tension to the cable to enable a controlled deformation of the cable. The cable may then be bent according to controlled radii of curvature of the cable so as to avoid deterioration of the cable and connectors of the camera and the monitor during movement of the movable support part.

These provisions further suppress vibrations or shock of the cable with the support thereby avoiding noise generation.

Besides, in case of a side support receiving the camera for acquiring lateral views, these provisions reduce strains on the fixed support part and the frame to which it is secured so that waterproofness can be ensured in an easier and more reliable manner at the interface between the fixed support part and the frame.

The tensioning arrangement may be arranged within the movable support part.

The cable may have a central axis and the tensioning arrangement may define a clearance within which the cable portion extends, the clearance being radial with respect to the central axis of the cable, the tensioning arrangement comprising at least one resilient member maintaining the cable portion within the clearance.

The tensioning arrangement may then resiliently maintain the cable portion within the clearance.

The resilient member may comprise a contact surface locally urged in contact with the cable portion and resiliently movable along a stroke, the stroke of the contact surface defining the clearance.

According to some provisions, the tensioning arrangement is configured to enable an homogenous deformation of the cable along an extended cable portion.

The tensioning arrangement may comprise a plurality of resilient members having the contact surfaces distributed along the cable portion.

In an alternative, the resilient member may comprise a resilient sheath having an inner space defining the clearance.

In a further alternative, the resilient member may comprise the cable portion having a resilient configuration, the tensioning arrangement further comprising a tubular guiding wall having an inner space defining the clearance.

The movable support part may be rotatably mounted about at least one rotation axis, the travel being centered with respect to a median plane extending between the camera and the rotation axis.

Said at least one support may comprise a lateral support, the fixed support part of which is secured outward the compartment at a distance in a transverse direction from the driving place, the movable support part supporting the camera and being movable with respect to the fixed support part between a driving position in which said movable support part extends substantially along the transverse direction so that the camera acquires a lateral view of the surroundings of the vehicle arranged rearward and at a side of the driving place, and at least one folded position in which said movable support part extends substantially along the longitudinal direction.

The frame may comprise a roof delimiting the compartment in a vertical direction and sides walls provided with respective driver and passenger doors delimiting the compartment in the transverse direction, the fixed support part being secured to a portion of the frame between the roof and the driver door.

Said at least one support may comprise an inner support, the fixed support part of which is secured inside the compartment, the movable support part supporting the monitor and being movable with respect to the fixed support part so as to adjust a position of the monitor with respect to the driving place.

The support may comprise an actuator configured to move the movable support part with respect to the fixed support part in the plurality of positions, and an electronic control unit connected to the actuator to control movement of the movable support part.

According to a second aspect, the invention proposes a viewing system for a vehicle as defined previously, the vehicle comprising a frame extending along a longitudinal direction and defining a compartment with a driving place, the viewing system being configured to provide a driver installed at the driving place with at least one view of surroundings of the vehicle, wherein the viewing system comprises:
at least one camera configured to acquire the view of the surroundings,
a monitor arranged within the compartment and configured to display the view of the surroundings,
at least one cable connecting the camera to the monitor,
at least one support comprising a fixed support part secured to the frame and a movable support part rotatably mounted on the fixed support part to present a plurality of positions with respect to the fixed support part, the movable support part supporting one device chosen among the camera and the monitor, wherein the support comprises at least one tensioning arrangement configured to resiliently urge at least a cable portion of the cable along a travel as the movable support part is moved in the plurality of positions.

BRIEF DESCRIPTION OF THE DRAWINGS

Other objects and advantages of the invention will emerge from the following disclosure of particular embodiments of the invention given as non limitative examples, the disclosure being made in reference to the enclosed drawings in which.

DETAILED DESCRIPTION

In the figures, the same reference numbers refer to the same or similar elements.

Figure 1:
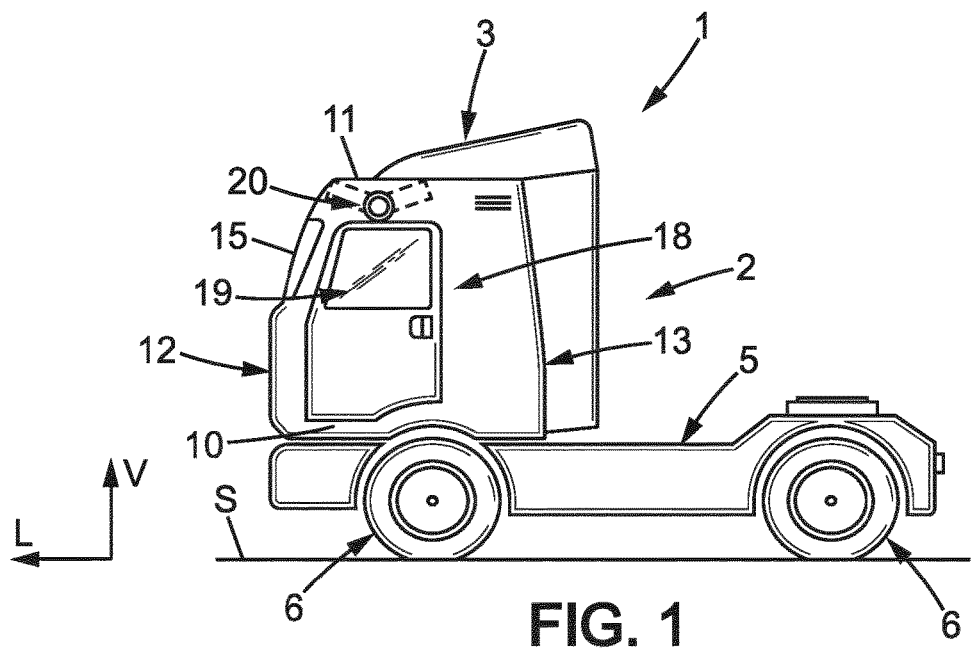
FIG. 1 is a representation of a vehicle comprising a frame defining a compartment with a driving place, and a viewing system in which a camera is mounted on a movable support part of a lateral support to acquire a view of surroundings of the vehicle, the movable support part being rotatably mounted on a fixed support part secured outward the compartment, to a side of the frame of the vehicle.

FIG. 1 represents a vehicle 1 according to an embodiment of the invention. In the represented embodiment, although not limited thereto, the vehicle 1 is a tractor of a truck comprising a frame 2 extending along a longitudinal direction L corresponding to a direction along which the vehicle 1 moves forward or rearward on a ground surface S. The frame 2 comprises a driver cab 3 defining a compartment 4 with a driving place where a driver may seat, and a chassis 5 adjoining the driver cab 3 in the longitudinal direction L. The driver cab 3 and the chassis 5 are mounted on wheels 6 driven by a motor system.

The driver cab 3 comprises:
- a floor 10 and a roof 11 delimiting the compartment 4 in a vertical direction V perpendicular to the ground surface S and to the longitudinal direction L,
- opposite front 12 and back 13 walls delimiting the compartment 4 in the longitudinal direction L, the front wall 12 being provided with a windshield 15 on an upper part, close to the roof 11, and with a front control panel 16 on a lower part, close to the floor 11,
- side walls 18 delimiting the compartment 4 in a transverse direction T perpendicular to the longitudinal L and vertical V directions, the side walls 18 being provided with respective driver and passenger doors 19.

Figure 2:
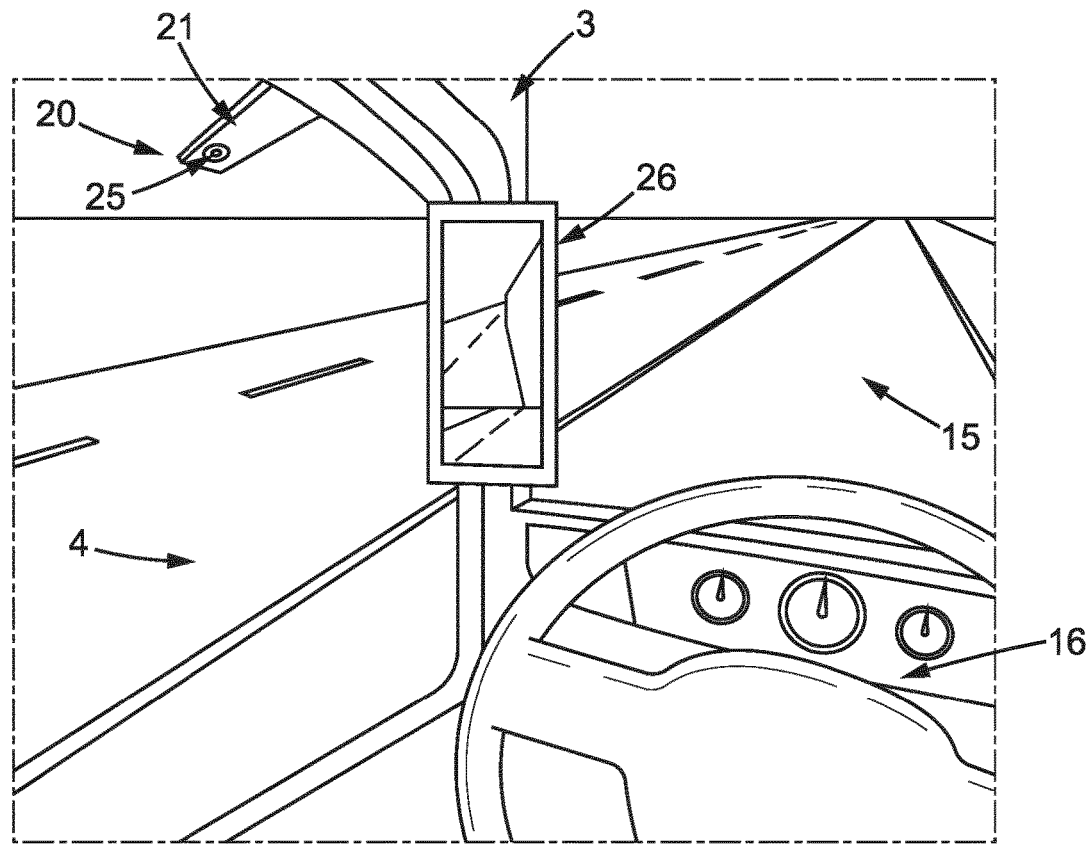
FIG. 2 is a representation illustrating a field of view of a driver installed at the driving place of the vehicle of FIG. 1, the viewing system further comprising a monitor arranged within the compartment and connected to the camera through a cable to display the view of the surroundings.

As shown in FIGS. 1 and 2, the vehicle 1 comprises a viewing system 20 configured to provide a driver installed at the driving place with one or several view of surroundings of the vehicle 1.

In FIGS. 1 and 2, a first embodiment of the viewing system 20 enabling a lateral view of the surroundings arranged rearward and at a side of the driving place is represented.

The viewing system 20 comprises a lateral support 21 mounted outward the compartment 4 on a side of the frame 2 of the vehicle 1, namely at a distance in the transverse direction T from the driving place, between the roof 11 and the driver door 19. A camera 25 configured to acquire the lateral view of the surroundings is mounted on the support 21 and a monitor 26 configured to display the view of the surroundings is arranged within the compartment 4.

To protect the camera 25 against deterioration or to enhance modularity of the viewing system 20 with specific constructive arrangements, the support 21 comprises a fixed support part 22 secured to the frame 2 and a movable support part 23 on which the camera 25 is mounted. The movable support part 23 is rotatably mounted about a rotation axis R on the fixed support part 22 to present a plurality of positions with respect to the fixed support part 22. As shown in FIGS. 1, 3 to 5, the plurality of positions includes a driving position in which the movable support part 23 extends away from the compartment 4 of the vehicle 1, substantially along the transverse direction T, and opposite first and second folded positions in which the movable support part 23 is brought close to the compartment 4 of the vehicle 1 substantially along the longitudinal direction L, respectively towards the front wall 12 and towards the rear wall 13.

Figure 3:
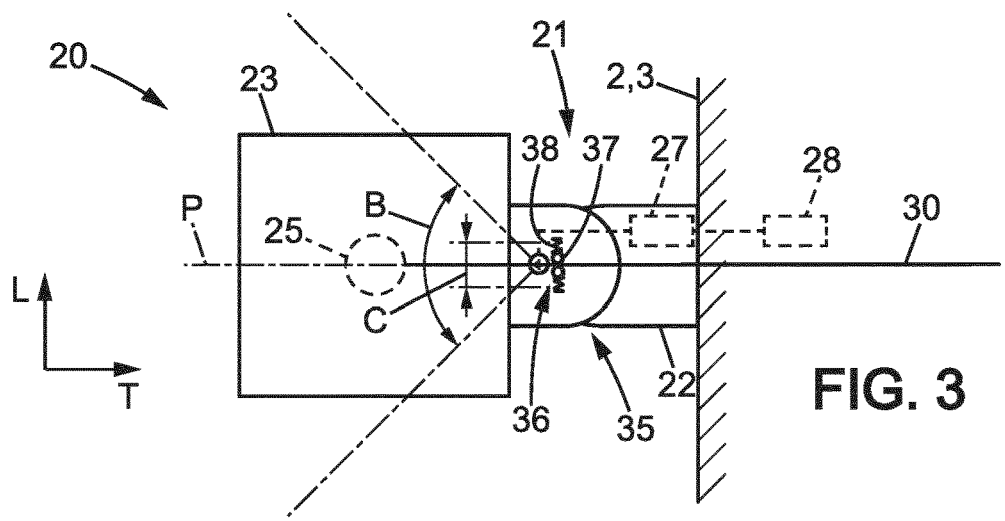
FIG. 3 is a representation of the viewing system of the vehicle of FIG. 1 according to a first embodiment of the invention, illustrating the moveable support part in a driving position in which it extends transversally with respect to the frame of the vehicle to acquire a lateral view of surroundings of the vehicle, a tensioning arrangement comprising resilient members with contact surfaces locally urged against a cable portion on either sides of the cable being provided.
Figure 4:
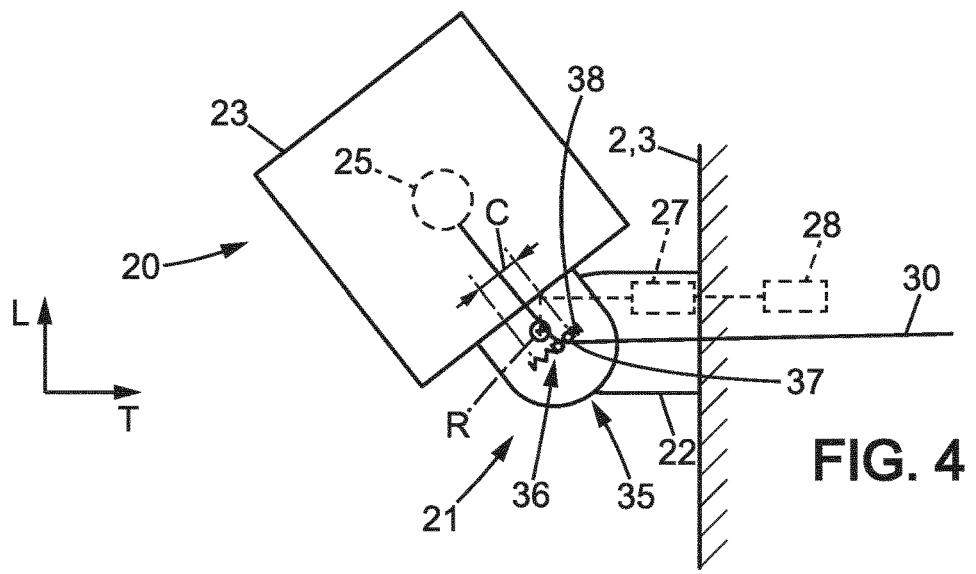
FIGS. 4 and 5 are representations of the viewing system according to the first embodiment of FIG. 3, illustrating the moveable support part in first and second opposite folded positions in which it extends along the frame of the vehicle.
Figure 5:
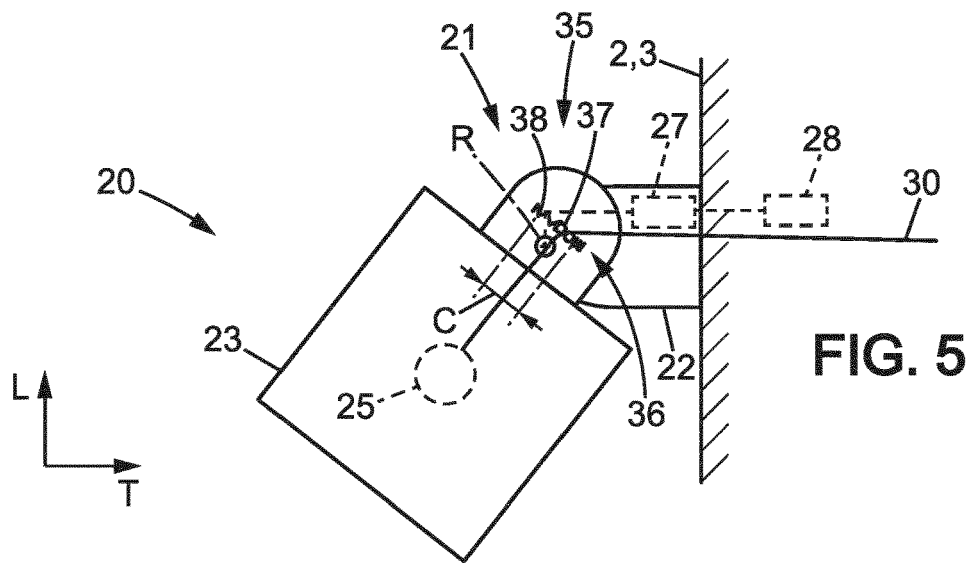

As best shown in FIGS. 3 to 5, the moveable support part 23 may be moved in the different positions in an automated manner thanks to an actuator 27 and an electronic control unit 28 connected to the actuator 27 to control movement of the movable support part 23 in accordance with instructions from the driver through a suitable electronic interface. Alternatively, the moveable support part 23 could be moved in the different positions manually by the driver.

In addition, a cable 30 connects the camera 25 to the monitor 26. The cable 30 has a central axis and is bendable so that curvature of the central axis may be changed. For example, the cable 30 may be a coax cable configured to transfer high resolution and high speed data.

As the movable support part 23 is moved in the different positions, the cable 30 runs along a travel B. Uncontrolled deformation of the cable 30 and strains applied to the cable 30 as the movable support part 23 is moved could deteriorate the cable 30 and or connectors of the cable 30 or of the camera 25.

To avoid such deterioration, the support 21 comprises a tensioning arrangements 35 configured to control deformation of the cable 30 and strains applied to the cable 30 through a suitable guidance.

In the represented embodiment, the tensioning arrangement 35 is arranged within the movable support part 23. It comprises two resilient members 36 having respective contact surfaces locally urged in contact with the cable 30 on either sides of a cable portion. The resilient members 36 resiliently reciprocate perpendicularly to a median plan P extending from camera 25 to the rotation axis R. For example, each resilient member 36 comprises a finger 37 having the contact surface and mounted on a coil spring 38 so that the contact surface is in permanent contact with the cable portion. The finger 37 may be moved along a stroke between compressed and extended states of the coil spring 38. The resilient members 36 then urge the cable portion within a clearance C defined by the strokes of the contact members 36 and that is radial with respect to the central axis of the cable 30, as the movable support part 23 is moved in the plurality of positions. In the represented embodiment, the clearance C is arranged within the movable support part 23 and centered with respect to the median plan P.

In FIG. 3, as the movable support part 23 is in the driving position, the cable 30 is substantially straight along the transverse direction T. In FIG. 4, as the movable support part 23 is moved frontward, toward the first folded position, the cable 30 is bent while being maintained in the clearance C by the tensioning arrangement 35, a first one of the resilient members 36 being in the compressed state while the second one is in the extended state to urge within the clearance C the cable portion and control the radius of curvature of the cable 30. Similarly, in FIG. 5, as the movable support part 23 is moved rearward, toward the second folded position, the cable 30 is bent while being maintained in the clearance C by the tensioning arrangement 35, the first resilient member 36 being in the extended state while the second one is in the compressed state.

Any other arrangement or configuration enabling the tensioning arrangement 35 to resiliently urge at least a cable portion along a travel B, within a determined clearance radial with respect to the central axis of the cable 30, could be otherwise provided.

In particular, the tensioning arrangement 35 could comprise only one resilient member or more than two resilient members arranged and configured in any other suitable manner, provided the resilient member may deform elastically between a rest state in the absence of any external strain and a deformed state under external strain, the resilient member returning elastically to the rest state.

Figure 6:
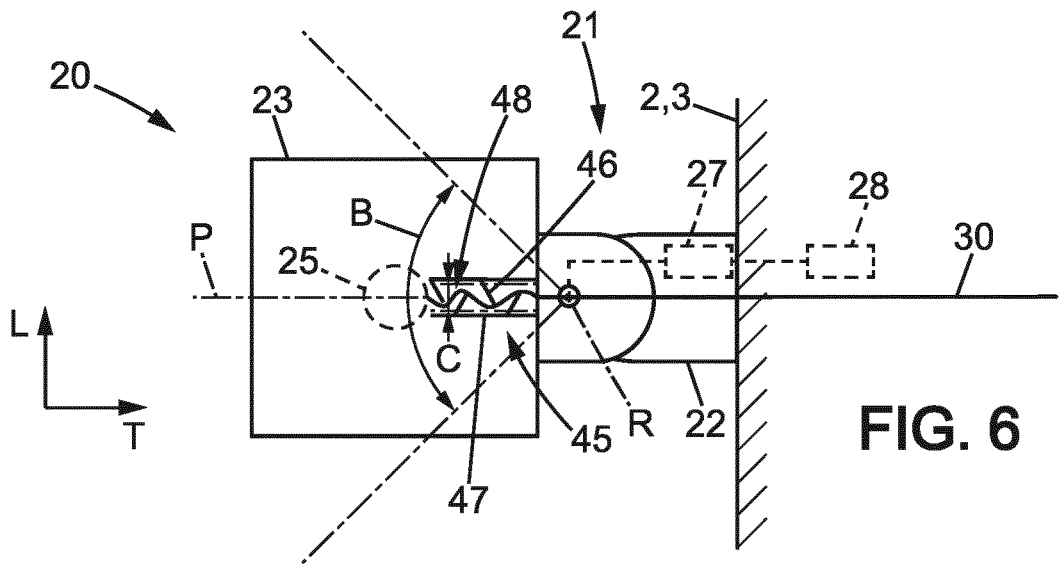
FIG. 6 is a representation of the viewing system of the vehicle of FIG. 1 according to a second embodiment of the invention, illustrating the moveable support part in the driving position, a tensioning arrangement comprising resilient members with contact surfaces distributed along the cable portion being provided.
Figure 7:
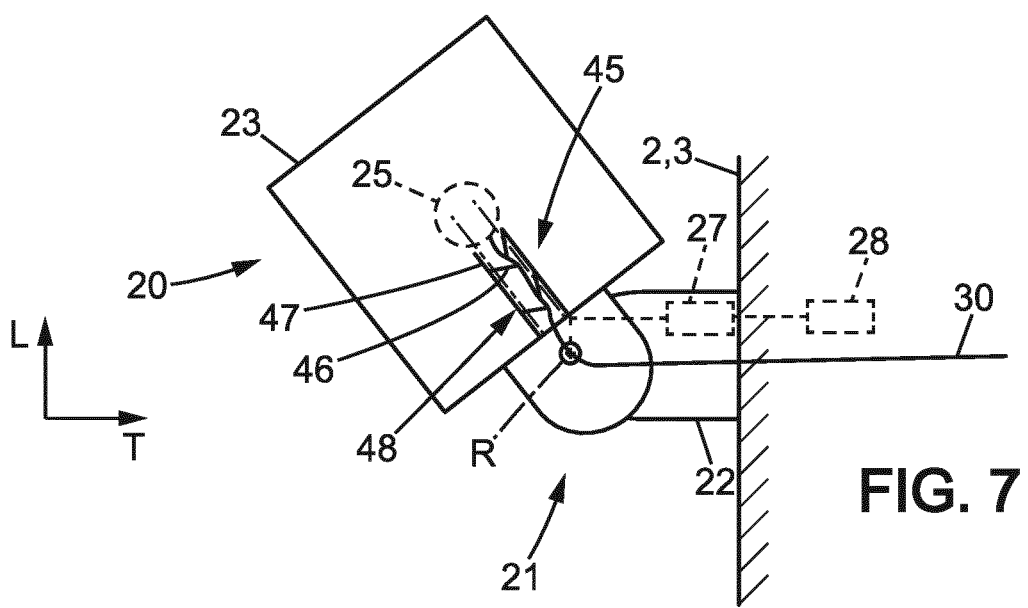
FIG. 7 is a representation of the viewing system according to the second embodiment of FIG. 6, illustrating the moveable support part in one of the first and second opposite folded positions in which it extends along the frame of the vehicle.

For example, in a second embodiment represented in FIGS. 6 and 7, the tensioning arrangement 45 comprises a tubular wall 47 having an inner surface delimiting an inner space 48. The tensioning arrangement 45 further comprises several resilient members 46, four in the represented embodiment, in the form of flexible tabs each extending from the inner surface 48 of the tubular wall 47 towards a free end. The resilient members are conformed and arranged so that the contact surfaces at their free ends are distributed along the cable portion. Each resilient member 46 is elastically deformable between the rest state and the deformed state along a stroke defining the clearance C within the inner space.

In FIG. 6, as the movable support part 23 is in the driving position, the cable 30 is substantially straight along the transverse direction T. In FIG. 7, as the movable support part 23 is moved frontward, toward the first folded position, the cable 30 is bent while being maintained in the clearance C by the tensioning arrangement 45, first ones of the resilient members 46 are in the deformed state while the second ones are returned to their rest state. A symmetric behavior can be observed as the movable support part 23 is moved backward, toward the second folded position.

Figure 8:
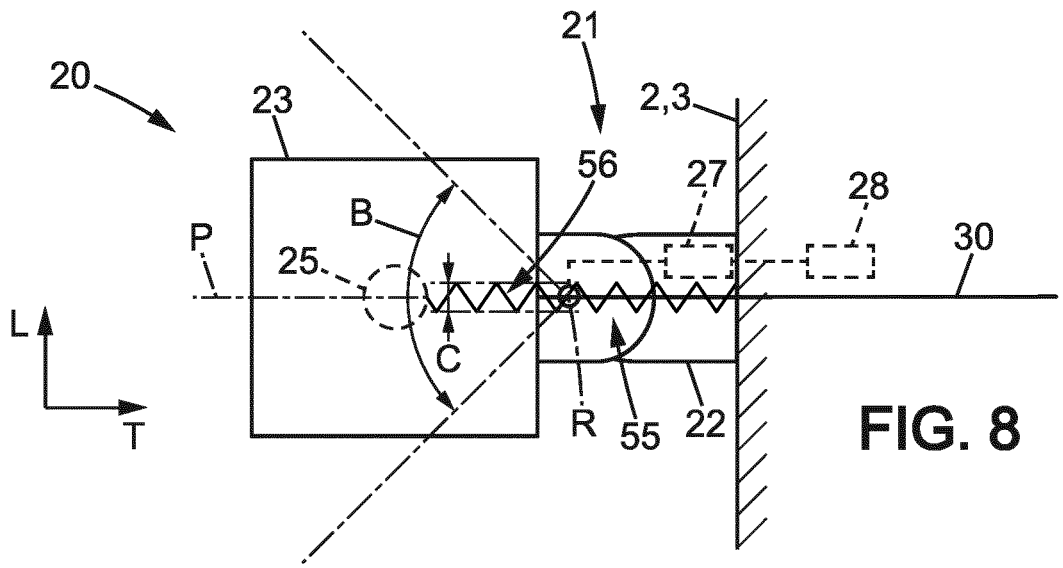
FIG. 8 is a representation of the viewing system of the vehicle of FIG. 1 according to a third embodiment of the invention, illustrating the moveable support part in the driving position, a tensioning arrangement comprising a resilient sheath surrounding the cable portion being provided.
Figure 9:
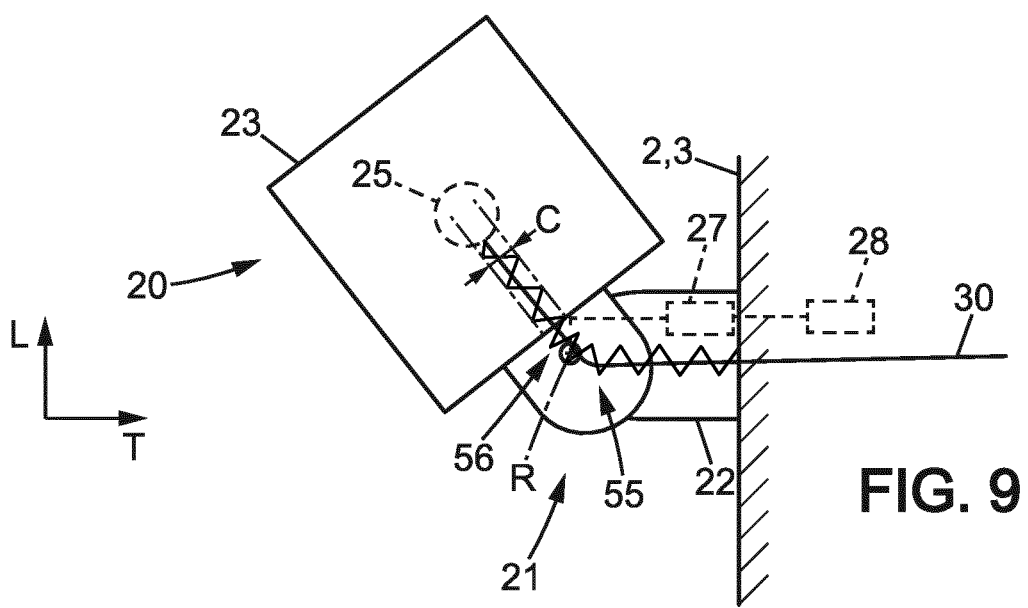
FIG. 9 is a representation of the viewing system according to the third embodiment of FIG. 8, illustrating the moveable support part in one of the first and second opposite folded positions in which it extends along the frame of the vehicle.

In a third embodiment represented in FIGS. 8 and 9, the tensioning arrangement 55 comprises a resilient member 56 in the form of a resilient sheath having an inner space defining the clearance C within which the cable portion extends. In the figures, the resilient sheath is a spring.

In FIG. 8, as the movable support part 23 is in the driving position, the cable 30 is substantially straight along the transverse direction T. In FIG. 9, as the movable support part 23 is moved frontward, toward the first folded position, the cable 30 is bent while being maintained in the clearance C by the tensioning arrangement 55, the resilient sheath being elastically deformed. A symmetric behavior can be observed as the movable support part 23 is moved backward, toward the second folded position.

Figure 10:
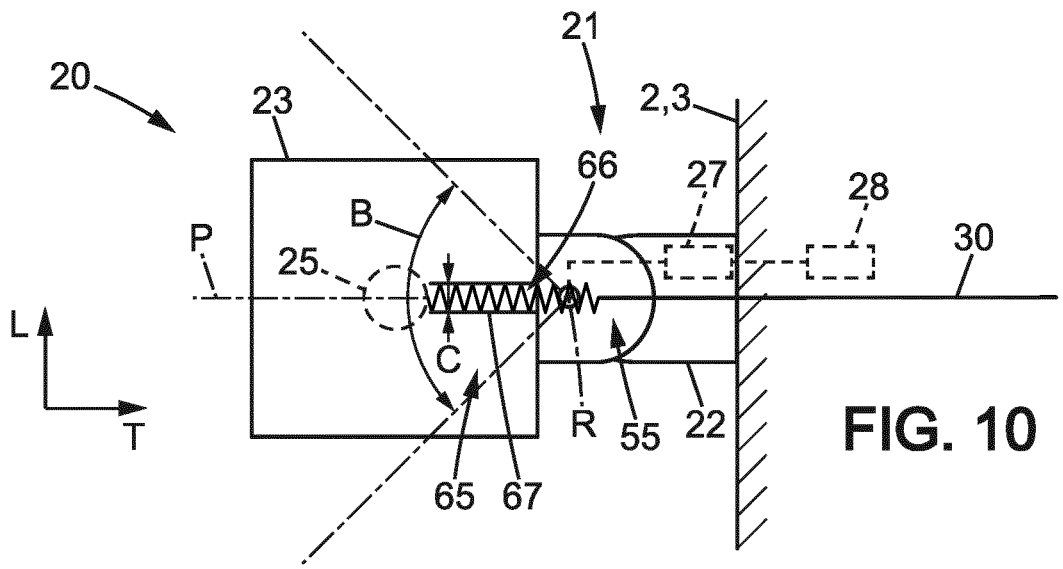
FIG. 10 is a representation of the viewing system of the vehicle of FIG. 1 according to a fourth embodiment of the invention, illustrating the moveable support part in the driving position, a tensioning arrangement comprising the cable portion having a resilient configuration, and a tubular guiding wall surrounding the cable portion being provided.
Figure 11:
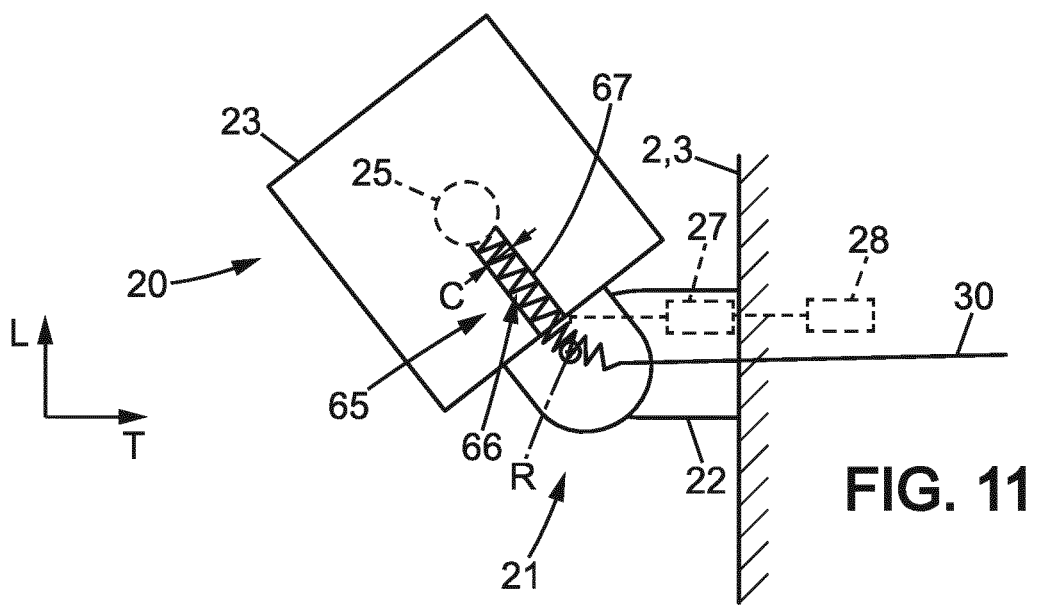
FIG. 11 is a representation of the viewing system according to the fourth embodiment of FIG. 10, illustrating the moveable support part in one of the first and second opposite folded positions in which it extends along the frame of the vehicle.

In a fourth embodiment represented in FIGS. 10 and 11, the tensioning arrangement 65 comprises a resilient member 66 formed by the cable portion itself having a resilient configuration. For example, the cable portion is conformed in coil spring like manner. The tensioning arrangement 65 further comprises a tubular guiding wall 67 having an inner space defining the clearance C.

In FIG. 10, as the movable support part 23 is in the driving position, the cable 30 is substantially straight along the transverse direction T. In FIG. 11, as the movable support part 23 is moved frontward, toward the first folded position, the cable 30 is bent while being maintained in the clearance C by the tubular guiding wall 67 of the tensioning arrangement 65, the resilient cable portion being elastically deformed. A symmetric behavior can be observed as the movable support part 23 is moved backward, toward the second folded position.

The movable support part 23 could be rotatably mounted on the fixed support part 22 in any other suitable manner including more than one rotation axes or a rotation center.

Besides, in the figures, only an arrangement part of the viewing system enabling a lateral view of the surroundings arranged rearward and at a side of the driving place is represented. The viewing system 20 could however be configured in any other suitable manner to provide other lateral views and possibly a rear view of the surroundings arranged rearward behind the driving place. The viewing system 20 may then comprise as many supports 21, cameras 25 and tensioning arrangements 35 as necessary.

Figure 12:
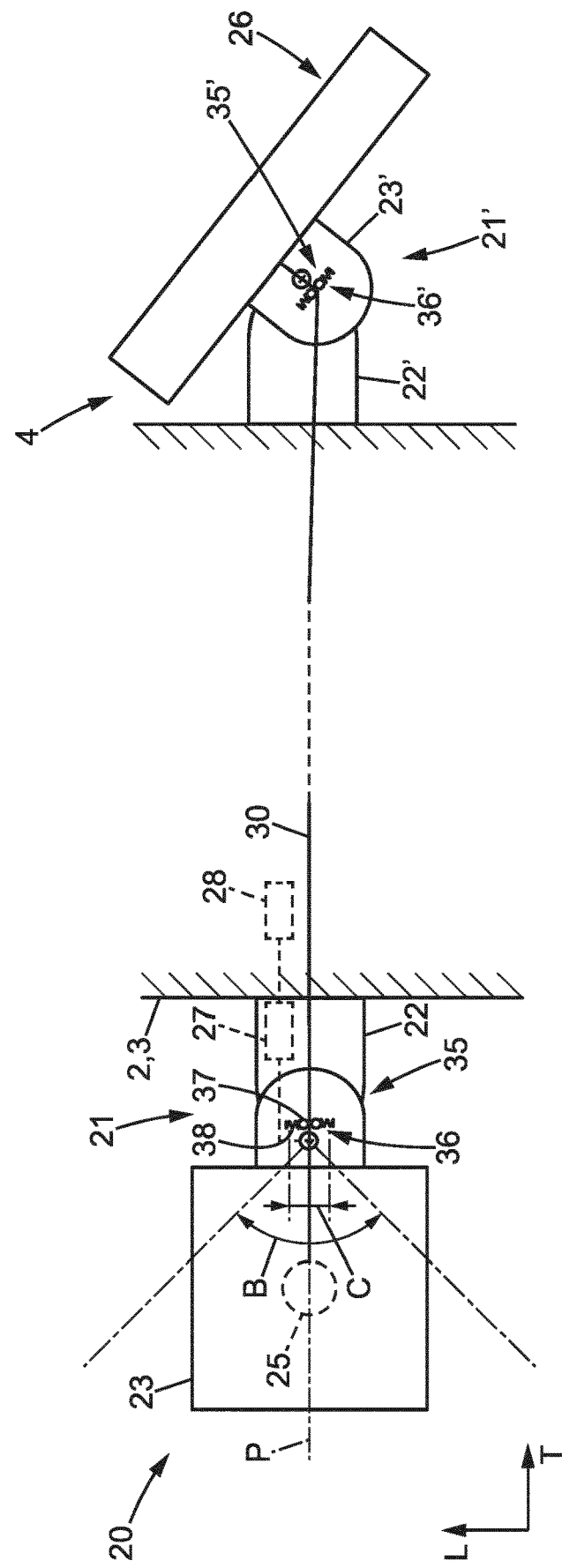
FIG. 12 is a representation of the viewing system of the vehicle of FIG. 1, in which the monitor is mounted on a movable support part of an inner support, the movable support part being mounted so as to be movable with respect to a fixed support part secured inside the compartment.

Alternatively or in a complementary manner, as shown in FIG. 12, an inner support comprising a fixed support part 22' secured inside the compartment 4 and a movable support part 23' receiving the monitor 26 could be provided. As previously disclosed, the movable support part 23' would be mounted on the fixed support part 22' in a movable manner to present a plurality of positions with respect to the fixed support part 22' and the driving place, a tensioning arrangement 35' with resilient members 36' similar to the tensioning arrangement of the lateral support of the first embodiment ensuring deformation of the cable 30 is controlled. Any other suitable tensioning arrangement could however be otherwise provided in the inner support.

The invention claimed is:

1. A vehicle comprising:
   a frame extending along a longitudinal direction and defining a compartment with a driving place, and
   a viewing system configured to provide a driver installed at the driving place with at least one view of surroundings of the vehicle, the viewing system comprises:
      at least one camera configured to acquire the view of the surroundings,
      a monitor arranged within the compartment and configured to display the view of the surroundings,
      at least one cable connecting the camera to the monitor,
      at least one support comprising:
         a fixed support part secured to the frame,
         a movable support part rotatably mounted on the fixed support part to present a plurality of positions with respect to the fixed support part, the movable support part supporting one device chosen among the camera and the monitor, and
      at least one tensioning arrangement configured to resiliently urge at least a cable portion of the cable along a travel as the movable support part is moved in the plurality of positions,
      wherein the movable support part is rotatably mounted about at least one rotation axis, the travel being centered with respect to a median plane extending between the camera and the rotation axis.

2. The vehicle of claim 1, wherein the tensioning arrangement is arranged within the movable support part.

3. The vehicle of claim 1, wherein the cable has a central axis and the tensioning arrangement defines a clearance within which the cable portion extends, the clearance being radial with respect to the central axis of the cable, the tensioning arrangement comprising at least one resilient member maintaining the cable portion within the clearance.

4. The vehicle of claim 3, wherein the resilient member comprises a contact surface locally urged in contact with the cable portion and resiliently movable along a stroke, the stroke of the contact surface defining the clearance.

5. The vehicle of claim 4, wherein the tensioning arrangement comprises a plurality of resilient members having the contact surfaces distributed along the cable portion.

6. The vehicle of claim 3, wherein the resilient member comprises a resilient sheath having an inner space defining the clearance.

7. The vehicle of claim 3, wherein the resilient member comprises the cable portion having a resilient configuration, the tensioning arrangement further comprising a tubular guiding wall having an inner space defining the clearance.

8. The vehicle of claim 1, wherein the at least one support comprises a lateral support, the fixed support part of which is secured outward the compartment at a distance in a transverse direction from the driving place, the movable support part supporting the camera and being movable with respect to the fixed support part between a driving position in which the movable support part extends substantially along the transverse direction so that the camera acquires a lateral view of the surroundings of the vehicle arranged rearward and at a side of the driving place, and at least one folded position in which the movable support part extends substantially along the longitudinal direction.

9. The vehicle of claim 8, wherein the frame comprises a roof delimiting the compartment in a vertical direction and sides walls provided with respective driver and passenger doors delimiting the compartment in the transverse direction, the fixed support part being secured to a portion of the frame between the roof and the driver door.

10. The vehicle of claim 1, wherein the at least one support comprises an inner support, the fixed support part of which is secured inside the compartment, the movable support part supporting the monitor and being movable with respect to the fixed support part so as to adjust a position of the monitor with respect to the driving place.

11. The vehicle of claim 1, wherein the support comprises an actuator configured to move the movable support part with respect to the fixed support part in the plurality of positions, and an electronic control unit connected to the actuator to control movement of the movable support part.

* * * * *